P. DE CARSALADE DU PONT.
SYLLABLE WRITING MACHINE.
APPLICATION FILED JULY 19, 1909.
1,006,061.
Patented Oct. 17, 1911.
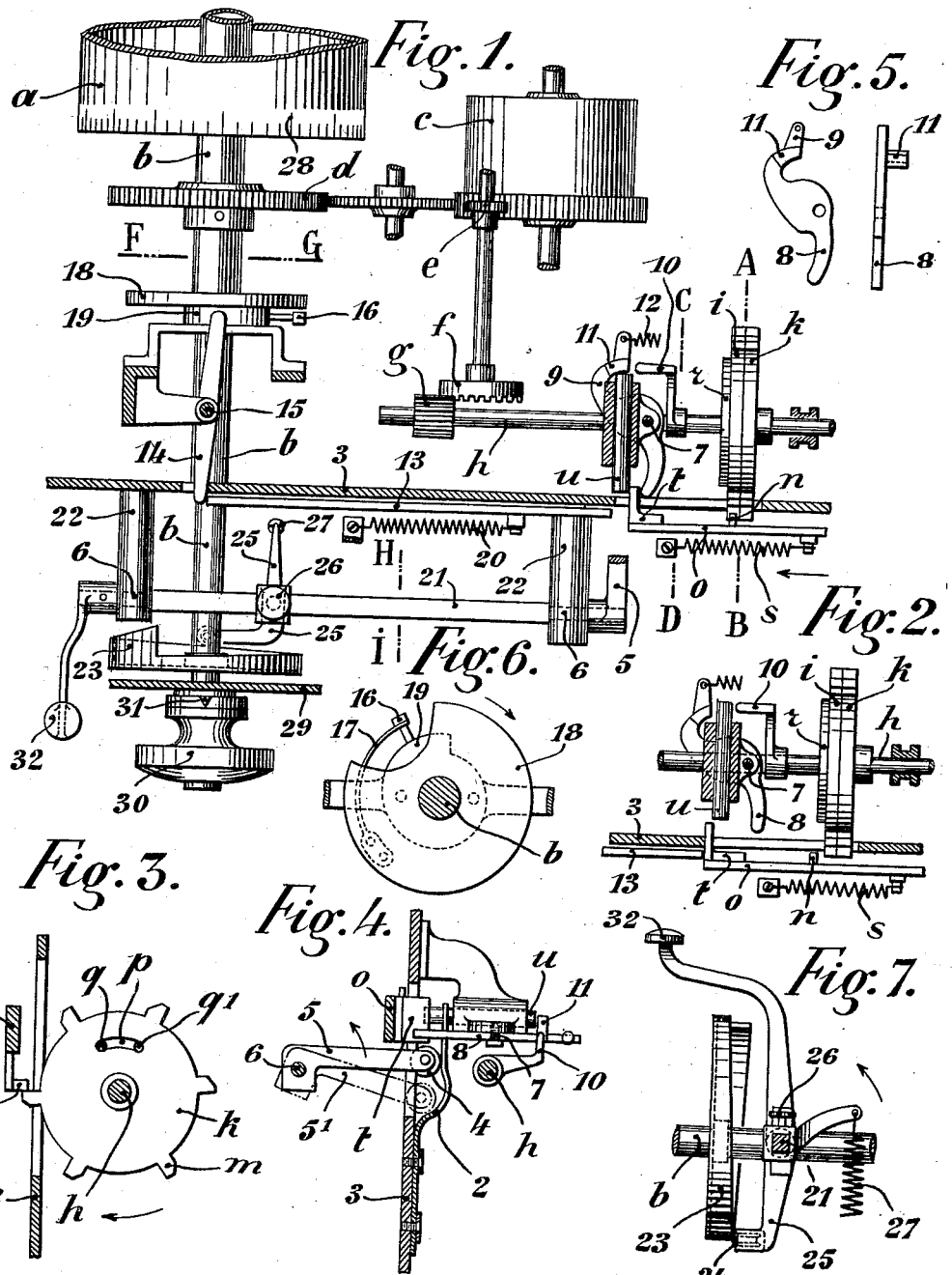
Witnesses.
Inventor.

UNITED STATES PATENT OFFICE.

PAUL DE CARSALADE DU PONT, OF PARIS, FRANCE, ASSIGNOR OF ONE-HALF TO GABRIEL ESCARRAS, OF PARIS, FRANCE.

SYLLABLE-WRITING MACHINE.

1,006,061.     Specification of Letters Patent.     Patented Oct. 17, 1911.

Application filed July 19, 1909. Serial No. 508,512.

*To all whom it may concern:*

Be it known that I, PAUL DE CARSALADE DU PONT, a citizen of the French Republic, and resident of Paris, France, have invented certain new and useful Improvements in Syllable-Writing Machines, of which the following is a specification.

This invention relates to syllable writing machines of that class in which the carriage whereon the paper is held, comprises a cylinder which revolves around its axle during the printing of one line and is displaced in axial direction to present the paper for the beginning of a new line of print, the object of the invention being, to shift the cylinder automatically.

In the accompanying drawings the improved device is shown in Figure 1 diagrammatically. Fig. 2 represents parts of the mechanism shown in Fig. 1 but in different position. Fig. 3 is a section on line A—B of Fig. 1; Fig. 4 is a section on line C—D of Fig. 1; Fig. 5 represents a constructional detail; Fig. 6 is a section on line G—F of Fig. 1; Fig. 7 is a section on line I—H of Fig. 1.

In the type writing machines of the class to which the present invention relates the cylinder $a$ is fixed on an axle or shaft $b$ which is driven by a suitable clock-work mechanism which for example can consist of a spring barrel $c$ which is destined to take said shaft $b$ along by means of a toothed wheel $d$ and convenient transmission gears. The spring barrel $c$ is locked by a wheel $e$ whose axle carries a pinion $f$ which meshes with a pinion $g$ keyed on a shaft $h$ which carries a conveniently constructed locking mechanism. This mechanism can, for example, be composed of two juxtaposed escapement wheels $i$ and $k$ which have each a certain number of teeth, the distance between two adjacent teeth being equal to the distance through which the cylinder $a$ revolves every time when the escapement mechanism is operated.

Fig. 3 shows that each escapement wheel $i$, $k$ has six teeth $m$ adapted to be stopped by a catch $n$ which is carried by the sliding bar $o$. The escapement wheel $k$ has a circular slot $p$ which corresponds in length with the distance between two adjacent teeth, the toothed wheel $i$ having a finger $q$ which penetrates into said slot; the toothed wheel $k$ is keyed upon the shaft $h$, and the wheel $i$ is loosely mounted upon said shaft.

Normally the catch $n$ locks the toothed wheel $i$ (Fig. 1) and its finger $q$ arrests the toothed wheel $k$ which is continuously impelled in the direction of the arrow (Fig 3) by the spring barrel $c$. Every time when a syllable is printed, the slide bar $o$ jumps to the right for a distance which corresponds to the thickness of one toothed wheel, $i$, $k$, so that the wheel $i$ is released and under the influence of a spring $r$ turns at once in the direction of the arrow (Fig. 1) until its finger $q$ has arrived at the position $q^1$; after the syllable has been printed the slide bar $o$ goes back to the left, being pulled by spring $s$, and at this moment the shaft $h$ revolves for the sixth part of a revolution until the wheel $k$ is again locked by the finger $q$. The shifting of the slide bar to the left is limited by a stop $t$ and by an abutment $u$ which are regulated so that the stop $n$ is arrested opposite the wheel $i$. There could certainly be obtained the same result by displacing the shaft $h$ for the same distance toward the left, however this movement is utilized in the writing machines of the class to which the present invention relates, for transmitting the depression of the spacing key.

The purpose of this invention is, to automatically shift the cylinder for the beginning of a fresh line. With this object in view the abutment $u$ is movable like a locking bolt and the invention particularly concerns the combination of parts which are destined to pull the said abutment out of the locking position at the proper moment so that the slide bar $o$ continues its movement to the left and assumes the position shown in Fig. 2 setting completely free the escapement wheels $i$, $k$, which under the influence of the spring barrel can revolve until the cylinder has turned sufficiently to present the paper sheet for the beginning of a fresh line, its displacement or shifting in longitudinal direction being effected in the well known manner. The removal of the abutment has to be effected at the moment where the last syllable of the line is being typed. In order to remove the abutment $u$ at this proper moment a blade spring 2 (Fig. 4) is provided which is fixed with one end on the plate 3 of the machine and which is destined to push the said abutment *u* against the screw-plate (position shown in Fig. 1). A roller 4 mounted upon the end of an arm 5 which is articulated on an axle 6 and which normally occupies the position 5¹, serves to act upon said blade spring 2 as soon as the arm 5 swings in the direction of the arrow (Fig. 4) which happens when the cylinder *a* gets near the end of its revolution, so that the blade spring, instead of pushing the abutment *u* against the plate 3 pulls it away from the same into the position shown in Fig. 2.

A stopping lever is arranged below the abutment *u*, which is represented in Fig. 5 and adapted to revolve around an axle 7. This stopping device comprises an arm 8 destined to come in contact with the stop *t*, and another arm 9 destined to abut against a finger 10 projecting from the shaft *h*. The arm 9 has a nipple 11 which is situated so that the abutment *u* abuts against the same in the position which is shown in Fig. 1, said stopping lever being secured in this position by means of spring 12. At each shifting of the slide bar *o* toward the right, the stopping lever oscillates around the axle 7 as its stop *t* abuts against the arm 8 and at each shifting of the shaft *h* to the left the stopping lever oscillates in the same manner owing to the finger 10 acting upon the arm 9 so that the stopping lever oscillates at the printing of any syllable.

Suppose the arm 5 occupied the position shown in Fig. 4, that is to say, the blade spring 2 were under tension; the abutment *u* is not pushed against the plate 3 but abuts against the nipple 11 and it will move away from the plate 3 at the next oscillation of the stopping lever so that at the printing of the next syllable said abutment *u* will assume the position shown in Fig. 2 after the arm 5 has oscillated; if hereafter the spring *s* returns the slide bar *o* to the left, it will not be stopped as usual so that the stop *n* does not engage with the escapement wheels *i*, *k* and cylinder *a* continues to revolve until the stop *n* has again assumed the stopping position Fig. 1. In order to effect this return of the stop *n* to the normal position, a sliding bar 13 has been arranged against whose right hand end the stop *t* abuts (position shown in Fig. 2). The other end of said sliding bar 13 is acted upon by a lever 14 which is adapted to pivot around the axle 15 and is submitted to the action of a trip 16 which is fixed at the free end of an elastic arm 17 whose other end is fixed upon a disk 18 keyed upon the main-shaft *b* (Fig. 6). This trip slides upon the periphery of a fixed cam 19 so that its radial distance with regard to the main shaft *b* gradually varies. The cam 19 is arranged so that it has lifted the push 16 at the completion of the revolution of the paper cylinder *a* against the lever 14 which oscillates and shifts the sliding bar 13 toward the right which movement is transferred by the stop *t* to the slide bar *o* which is shifted so far that the stop *n* comes again in engagement with the escapement mechanism, locking the same. Simultaneously the arm 5 has arrived at its normal position 5¹ and the abutment *u* is moved back to the position shown in Fig. 1 and prevents the return of the slide bar *o* toward the left; the disk 18 continues to revolve and the trip 16 drops to the lowest point of the cam 19, spring 20 being thus free to bring the sliding bar 13 and the lever 14 back to their normal positions. It has still to be explained how the arm 5 is made to oscillate at the proper moment to put the spring 2 under tension for shifting the abutment *u*. Arm 5 which is mounted upon one end of a square rod 21 receives its oscillating motion from said square rod. This rod 21 is adapted to revolve with its pivots 6 in supports 22 which are mounted in the plate 3 of the machine. The square rod 21 is enlarged at one part so that it goes around the shaft *b*, the axle of said shaft and the axle of the square rod being situated in the same horizontal plane (Fig. 7). A worm disk 23 is keyed on the front end of the main shaft *b* and a roller 24 mounted at the end of an arm 25 slides upon the periphery of said worm disk. The arm 25 is fixed upon the square rod 21 by means of a set screw 26. A spiral spring 27 serves for continuously pressing the roller 24 against the periphery of the worm disk. If therefore the worm disk revolves with the main shaft, the roller 24 is gradually lifted and the square rod 21 turned so that the arm 5 keyed upon said rod will have arrived at the position 5¹ when the last but one syllable of the line has been printed. Hereupon the spring 2 is pulled back from the abutment *u* and the hereinbefore described mechanism for releasing the paper cylinder will function when the last syllable is being printed, said cylinder being returned to the starting point as soon as this last syllable of the line has been printed.

As shown in Fig. 4, the spring 2 is bent corresponding to the path of the roller 4 so that this roller begins to act upon said spring only after it has reached the position shown in Fig. 4. After the printing of the last syllable of the line the worm disk 23 has completed its revolution so that, if the disk continues to revolve, the roller 24 will drop to the lowest point of the periphery of said worm disk, being pushed by the spring 27, arm 5 being thus brought back to the position 5¹ before the sliding bar 13 begins to shift to the left, so that the abutment *u* has arrived at its locking position before the operation of said bar.

In order to regulate the length of the lines to be printed or in order to regulate the revolving motion of the paper cylinder in proportion with the width of the paper sheet, the worm disk 23 is adjusted upon the main shaft. The paper cylinder *a* has a graduated scale 28 which corresponds with the spacing of the letters to be printed and a corresponding graduated scale 29 is marked upon the front plate of the machine, a hand knob 30 with a hand 31 being provided which is connected with the worm wheel 23 in such a manner that the hand 31 indicates the proper position of said worm wheel upon the graduated scale 29, said position being regulated so that it corresponds exactly with the position of the paper sheet upon the paper cylinder which is indicated on the scale 28 by the right hand side edge of said sheet. The worm wheel 23 can be adjusted so that the roller 24 arrives at the highest point of the periphery of said disk before the paper cylinder has completed its revolution, so that the escapement mechanism is released and the paper cylinder turns back for the beginning of a fresh line of print in the manner which has just been described.

To shift the paper cylinder so that it presents the paper for the printing of a fresh line at any point of its revolution, the oscillation of arm 5 is produced by the depression of the spacing key 32, whereby the finger 10 is made to act upon the nipple 11 through the intermediary of the square rod upon which said spacing key acts directly.

I claim:—

In a syllable writing machine, an automatic line shifting device comprising in combination an abutment which stops the rotation of the cylinder, an arm of said abutment which prevents the movement of the same but releases it at the printing of each syllable, a spring which acts upon said abutment for maintaining the same in the locked position at the beginning of a new line, but impels the same when there are only eight spaces left in the line so that the release of the abutment is effected when after this moment a syllable has been printed, in order to obtain the automatic shifting of the line without the use of a special key, without any manipulation of the typist and as soon as the last word has been printed on the line or between two syllables, substantially as described and shown and for the purpose set forth.

In witness whereof I have hereunto set my hand in the presence of two witnesses.

PAUL DE CARSALADE DU PONT.

Witnesses:
   FERDINAND NUSCH,
   RUDAY GUT.

---

Copies of this patent may be obtained for five cents each, by addressing the "Commissioner of Patents, Washington, D. C."